(12) United States Patent
Sharma et al.

(10) Patent No.: US 9,003,473 B2
(45) Date of Patent: Apr. 7, 2015

(54) ENHANCED TELEVISION EXTENSION

(75) Inventors: Sudhanshu Sharma, Coppell, TX (US); Karthic Chinnadurai, Chennai (IN); Vedhashree Sampath, Chennai (IN); Shrividhyaa Kannan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 619 days.

(21) Appl. No.: 12/614,490

(22) Filed: Nov. 9, 2009

(65) Prior Publication Data

US 2011/0113450 A1    May 12, 2011

(51) Int. Cl.
| | | |
|---|---|---|
| *H04N 7/173* | (2011.01) | |
| *H04N 7/16* | (2011.01) | |
| *H04N 21/462* | (2011.01) | |
| *H04N 21/81* | (2011.01) | |
| *H04N 21/426* | (2011.01) | |
| *H04N 21/475* | (2011.01) | |
| *H04N 21/643* | (2011.01) | |
| *H04N 21/854* | (2011.01) | |

(52) U.S. Cl.
CPC ......... *H04N 21/4622* (2013.01); *H04N 21/818* (2013.01); *H04N 21/42684* (2013.01); *H04N 21/4756* (2013.01); *H04N 21/64322* (2013.01); *H04N 21/85406* (2013.01)

(58) Field of Classification Search
None
See application file for complete search history.

(56) References Cited

U.S. PATENT DOCUMENTS

| | | | |
|---|---|---|---|
| 2006/0130120 A1* | 6/2006 | Brandyberry et al. | 725/136 |
| 2009/0150941 A1* | 6/2009 | Riedl et al. | 725/61 |
| 2009/0217329 A1* | 8/2009 | Riedl et al. | 725/93 |
| 2010/0293497 A1* | 11/2010 | Peterson | 715/773 |
| 2011/0090898 A1* | 4/2011 | Patel et al. | 370/352 |

* cited by examiner

*Primary Examiner* — Brian T Pendleton
*Assistant Examiner* — Jean D Saint Cyr

(57) ABSTRACT

A method may include receiving an enhanced television (ETV) application in a video client over a first data path and executing the ETV application in the video client. In one embodiment, the ETV application may include an enhanced television binary interchange format (EBIF) resource. The method may also include extracting, from the EBIF resource, an identifier of an extension application and requesting the identified extension application. The method may include receiving the extension application, over a second data path different than the first data path and executing the extension application.

25 Claims, 15 Drawing Sheets

200

REMOTE
CONTROL
232

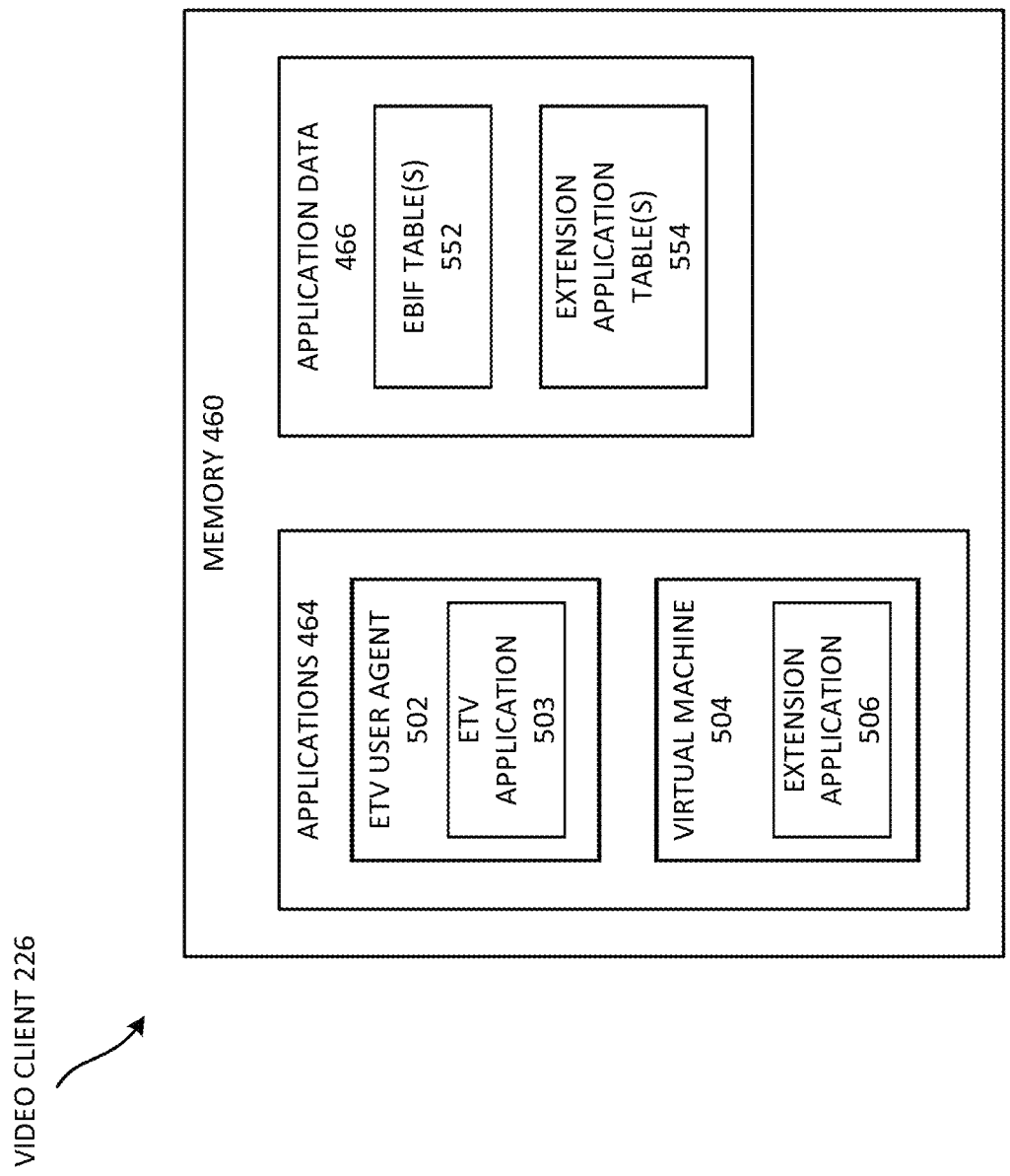

MEMORY 460

| EXTENSION OPERATION CODE | EXTENSION NAME | EXTENSION DESCRIPTION |
|---|---|---|
| 0x00 | NOOP | NO OPERATION |
| 0x01-0x0F | RESERVED | RESERVED |
| 0x11 | LOG STRING | LOGS METRICS COLLECTED BY THE EBIF APPLICATION |
| 0x12 | POST EVENT | POST EVENT TO ETV USER AGENT |
| 0x13 | LAUNCH APPLICATION | LAUNCH EXTENSION APPLICATION |
| 0x15 | UPDATE TABLE(S) | UPDATE EBIF TABLE(S) OVER SECOND DATA PATH |

EXTENSION CODE TABLE 592

MEMORY 460

UPDATE TABLES 596

| EXTENSION OPERATION CODE | OPERANDS | DESCRIPTION |
|---|---|---|
| 0x15 | OP1, OP2 | MAKES AN ASYNCHRONOUS CALL TO THE URI SPECIFIED BY OP1 AND PASSES OP2 AS ADDITIONAL PRIVATE DATA THAT IS POSTED TO THE SPECIFIED URI TO REQUEST DATA UPDATE FOR ONE OR MORE TABLES |

| OPPERAND | TYPE | DESCRIPTION |
|---|---|---|
| OP1 | UNIT16 | INDEX INTO VARIABLE REFERENCE TABLE, WHERE THE INDEXED ENTRY DEREFERENCES A STRING VALUES. THE STRING SPECIFIES THE URL WHERE THE HTTP REQUEST IS TO BE MADE TO |
| OP2 | UNIT16 | INDEX INTO VARIABLE REFERENCE TABLE, WHERE THE INDEXED ENTRY DEREFERENCES A STRING VALUE. THE STRING SPECIFIES THE PRIVATE DATA THAT IS POSTED ALONG WITH THE HTTP POST REQUEST TO THE URL SPECIFIED BY OP1. |

MEMORY 460

| EXTENSION OPERATION CODE | OPERANDS | DESCRIPTION |
|---|---|---|
| 0x12 | EVENT | POST AN EVENT TO THE ETV USER AGENT WITH OPTIONAL PARAMETER. THE NUMBER OF PARAMETERS IS DETERMINED BY THE LENGTH OF THE EXTENSION OPCODE. |

| OPPERAND | TYPE | DESCRIPTION |
|---|---|---|
| EVENT | UNIT16 | AN UNSIGNED INTEGER THAT SIGNALS THE EVENT TO BE POSTED TO THE ETV USER AGENT. |
| OP1 | UNIT16 | IF OT EQUAL TO 0xFFF, THEN AN INDEX INTO VARIABLE REFERENCE TABLE, WHERE THE INDEXED ENTRY DEFERENCES A VALUE AS SPECEFIED FOR THE EVENT. |

POST EVENT TABLES 598

ENHANCED TELEVISION EXTENSION

BACKGROUND INFORMATION

Enhanced Television (ETV) is a collection of specifications that define ETV applications, such as interactive television programs. An ETV application may be delivered to end users through an MPEG (Motion Pictures Expert Group) transport stream, which may include video and audio streams. An ETV application may include resources (e.g. files) adhering to the Enhanced TV Binary Interchange Format (EBIF). EBIF specifies graphical widgets (e.g., buttons, dialog boxes, etc) and bytecodes (e.g., an instruction set), for example, for ETV applications.

BRIEF DESCRIPTION OF THE DRAWINGS

FIG. 5A is a block diagram of exemplary components of the memory in the video client of FIG. 2;

FIG. 5C is a diagram of an exemplary extension code table;

FIGS. 5D, 5E, and 5F are diagrams of exemplary launch code tables, update tables, and post event tables described in FIG. 5C;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
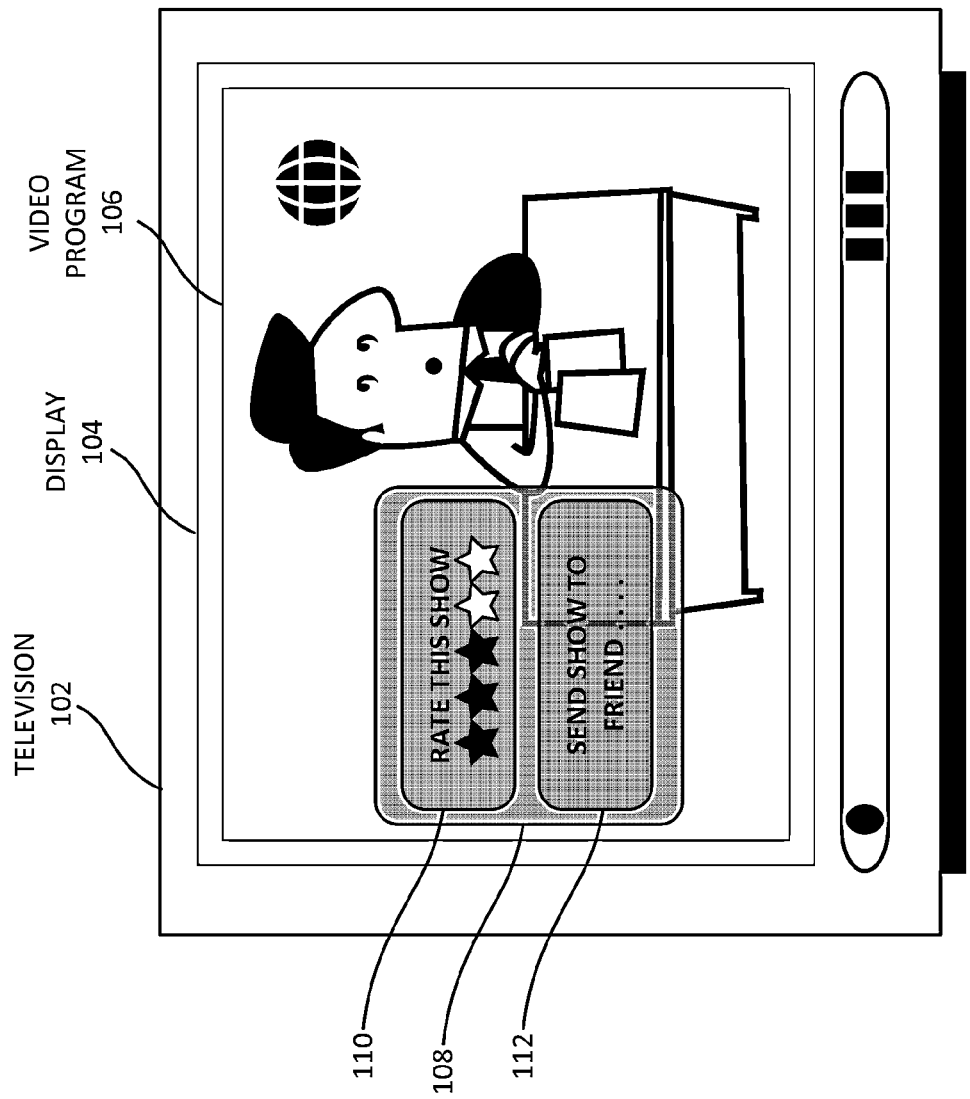
FIG. 1 is a diagram of an overview of an exemplary embodiment described herein.

One or more embodiments disclosed herein allow for extending the Enhanced Television (ETV) experience for a user. FIG. 1 is a diagram of an overview of an exemplary embodiment including a television in, for example, a customer's home. As shown in FIG. 1, a television 102 includes a display 104, which displays a video program 106. Superimposed on video program 106 is a graphical widget 108 (or "widget 108"). As illustrated, graphical widget 108 includes two additional graphical widgets, e.g., rating widget 110 and send-show widget 112. Rating widget 110 allows the user to rate video program 106, giving program 106 a rating ranging from one star (a poor rating) to five stars (a good rating). One or more embodiments disclosed herein allows for personalized interactive television. For example, send-show widget 112 may allow the user to send the show (e.g., a link to the show, a copy of the show, etc.) to a friend from among a group of friends. Other embodiments, described below, allow for additional interactive features.

Figure 2:
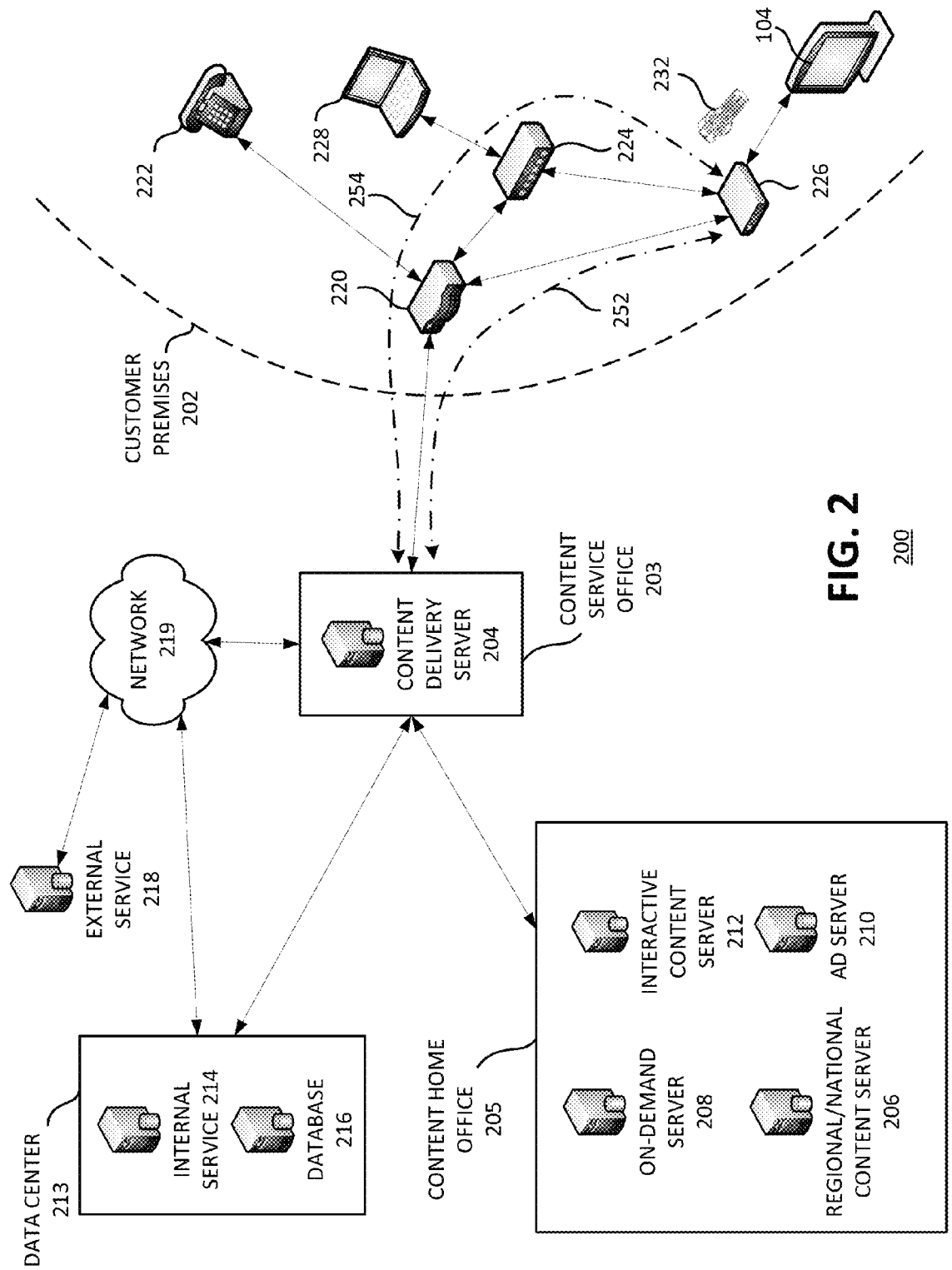
FIG. 2 is a diagram of an exemplary environment for implementing embodiments described herein.

FIG. 2 is a diagram of an exemplary environment 200 for implementing embodiments described herein. As shown in FIG. 2, environment 200 may include a customer premises 202, a content server office 203, a content home office 205, a data center 213, an external service component 218, and a network 219. In this embodiment, content service office 203 may deliver content or data to customer premises 202 (e.g., a customer's home) from content home office 205 and/or data center 213.

Content service office 203 may include components to collect and deliver content (e.g., interactive video content) to customer premises 202 and to receive data from customer premises 202 for forwarding to the proper destination (e.g., network 219 or interactive content server 212). For example, a content delivery server 204 may include a content mixing engine (e.g., a multiplexer/demultiplexer) to select information, such as on-demand content (e.g., from on-demand server 208), regional/national video content (e.g., from regional/national content server 206), interactive content (e.g., from interactive content server 212), and/or advertising content (e.g., from ad server 210), and mix the content together. Content delivery server 204 may also receive data from customer premises 202 for delivery to any one of servers 206-212 or any device coupled to network 219 (e.g., any device coupled to the Internet).

Content home office 205 may include a regional/national content server 206, an on-demand server 208, an advertisement (ad) server 210, and an interactive content server 212. Regional/national content server 206 may provide television broadcasts (e.g., local broadcasts, such as NBC, CBS, ABC, and Fox). On-demand server 208 may provide on-demand services (e.g., music, video, and/or games on-demand). On-demand server 232 may include a database (not shown) that may store on-demand content that may be provided by on-demand server 232. Ad server 210 may control the advertising content (e.g., commercials) that is presented with content, such as the national and/or regional content. Ad server 236 may include interactive content that may be interpreted by a video client (e.g., video client 226) displaying content on, for example, a display (e.g., display 104) of a television.

Interactive content server 238 may serve and manage interactive content (e.g., any form of content with which a user can interact). For example, interactive content may include an interactive program guide, a food ordering service, interactive advertisements, and weather or traffic information. Interactive content may be stored as, for example, ETV applications and resources, Lua applications, and/or JavaScript applications.

Data center 213 may house a collection of devices that manage and/or store information associated with interactive content. As shown in FIG. 2, data center 213 may include an internal service component 214 and a database component 216.

Internal service component 214 may include a server that stores and provides extensive interactive program information that may be tailored for individual users. The interactive program information may include EBIF tables, ETV applications, Lua applications, and/or JavaScript applications. Database component 216 may include a server that stores the interactive program information for easy access by internal service component 214. The interactive program information may include information tailored to specific users, such as a user's contact information and/or a list of a user's friends' contact information, for example. Users may be provided with an interface that enables them to update their information. For example, a user may log into a particular web site to update the user's contact or other information.

Like internal service component 214, external service component 218 may also include a server that stores and provides extensive interactive program applications that may be tailored for individual users. External service component 218 may allow for an entity not associated with data center 213, content home office 205, or content delivery server 204 to provide interactive content to premises 202, for example. External service component 218 may communicate with components in data center 213 directly (not shown) or through network 219, for example.

Network 219 may include one or more packet switched networks, such as an Internet protocol (IP) based network, a local area network (LAN), a wide area network (WAN), a personal area network (PAN), an intranet, the Internet, or another type of network that is capable of transmitting data. Network 219 may include a circuit-switched network, such as a public-switched telephone network (PSTN) for providing telephone services for traditional telephones. Network 219, in conjunction with components in content service office 203, may allow devices at customer premises 202 (e.g., computer 228 and/or video client 226) to connect to other devices also attached to network 219, such as third party web site servers (not shown) or other customers (not shown).

Customer premises 202 (e.g., a customer's home) may include an optical network terminal (ONT) 220, a telephone 222, a router 224, a video client 226, a computer 228, a display 104, and a remote control 232. ONT 220 may receive data, e.g., on a fiber optic cable, and may transfer the data to the appropriate device in customer premises 202, such as telephone 222, router 224, or video client 226. Likewise, ONT 220 may receive data from any device in customer premises 202 and may transmit the data to other devices in environment 200, e.g., through a fiber optic cable. For example, in one embodiment, if ONT 220 receives data forming part of an internet request, ONT 220 may transfer the data to router 224 in the appropriate format (e.g., a data packet over Ethernet). In this embodiment, if ONT 220 receives data representing a telephone call, ONT 220 may transfer the data to telephone 222 in the appropriate format (e.g., an analog telephone format). In this embodiment, if ONT 220 receives data representing a television program, ONT 220 may transfer the data to video client 226.

Router 224 may receive data (e.g., a packet) on one port and may forward the received data on another port in the direction of the destination of the data. For example, router 224 may receive a packet from computer 228 and may forward the packet to ONT 220 for forwarding to a computer in another customer's home (not shown). Likewise, router 224 may receive a packet from ONT 220 and may forward the packet to computer 228. Router 224 may also include a switch, a hub, a firewall, etc.

Video client 226 (e.g., a set-top box) may receive content from content delivery server 204, for example, and output the content to display 104. In some embodiments, the content may be obtained from via on-demand server 208, regional/national content server 206, ad server 210, and/or interactive content server 212. Although video client 226 may include a set-top box, video client 226 may include a component (e.g., a cable card or a software package) that plugs into a host device (e.g., a digital video recorder (DVR), a personal computer, a television, stereo system, etc.) and allows the host device to display content (e.g., multimedia content on television channels). Video client 226 may also be implemented as a home theater personal computer (HTPC), an optical disk player (e.g., digital video disk (DVD) or Blu-Ray™ disc player), a cable card, etc. Video client 226 may receive commands from remote control 304 and/or control server 208.

Video client 226 may have access to more than one data path (e.g., two data paths 252 and 254 as shown in FIG. 2) on which to send and receive interactive application data. A first data path 252 may carry, for example, cable-TV broadcast signals in analog or digital format (e.g., MPEG-2 or MPEG-4 data streams). In one embodiment, many TV broadcast signals may travel through first data path 252 to video client 226 simultaneously. First data path 252 may also carry interactive applications and resources (e.g., ETV applications and resources) interleaved in or otherwise transmitted with the digitally broadcast streams. First data path 252 may be bidirectional and may allow data to be sent from video client 226 to, for example, content deliver server 204.

A second data path 254 may carry additional data to or from video client 226. Second data path 254 may implement a packet-switched data protocol, such as IP, Ethernet, and/or IP over Ethernet. As such, second data path 254 may pass through router 224. In another embodiment, second data path 254 does not pass through router 224 but may pass directly to ONT 220. In this embodiment, second data path 254 is not shared with video content delivered to video client 226 or to other video clients (e.g., other customer homes). Not sharing second data path 254 with data in first data path 252 means that the amount of data being carried on first data path 252 (e.g., video programs) may not interfere with the amount of data that second data path 254 is capable of carrying.

In one embodiment, first data path 252 may not be able to carry as much interactive application data as compared to second data path 252. In other words, the bandwidth of first data path 252 (for carrying interactive application data) may be less than the bandwidth for second data path 254 (for carrying interactive application data). In addition, the latency of first data path 252 (for carrying interactive application data) may be larger than the latency for second data path 254. These differences in bandwidth and latency may result from the standard for carrying the interactive data (e.g., ETV and EBIF versus IP over Ethernet) and/or because first data path 252 is shared among many downstream video programs and many customers' homes. The differences in bandwidth and latency may also be true for carrying interactive application data in both directions (e.g., toward video client 226 and away from video client 226). Thus, in one embodiment, first data path 252 is different than second data path 254 in that the two paths employ different protocols (e.g., ETV/EBIF versus IP/Ethernet).

Remote control 232 may issue wired or wireless commands for controlling other electronic devices (e.g., a television, set-top box, stereo system, digital video disc (DVD) player, etc.). Remote control 232, in conjunction with video client 226, may allow a user to manually select TV programs to view on display device 230. In one embodiment, remote control 232 may be used in conjunction with video client 226 to receive interactive content for display on display 104. In different embodiments, in place of remote control 232, other types of devices (e.g., a keyboard, mouse, handheld device (e.g., cellular phone), etc.) may be used to control the electronic devices.

Display 104 may play media signals and/or signals from content player device 302. Display 104 may include speakers and a display. Display 104 may include a portable digital assistant (PDA), a cell phone, or any device capable of receiving and displaying content (e.g., audio and/or video). Display 104 may be described herein as a television for simplicity and ease of understanding.

Telephone 222 may allow a user to place and receive calls to other devices. For example, the user of telephone 222 in customer premises 202-1 may place a call to a telephone in another customer premises. Telephone 222 may include a legacy telephone, e.g., an analog telephone typical of a public-switched telephone network (PSTN). In one embodiment, telephone 222 may include an IP telephone. In this embodiment, telephone 222 may connect to router 224, for example, rather than directly to ONT 220.

The exemplary configuration of devices in environment 200 is for simplicity. In some embodiments, the functions performed by two or more devices may be performed by any one device. Likewise, in some embodiments, the functions performed by any one device may be performed multiple devices. Environment 200 may include more devices, fewer devices, or a different configuration of devices than illustrated in FIG. 2. For example, in one embodiment, customer premises 202 may not include ONT 220. Rather, customer premises 202 may include video client 226 connected to network 219 directly through a coaxial cable (e.g., connected to a cable TV provider). In this embodiment, router 224 may connect to a cable modem (not shown) rather than ONT 220. In another embodiment, telephone 222 may connect directly to a PSTN included in network 219 or through a gateway connected to router 224. As another example, environment 200 may include one or more than two customer homes, e.g., thousands or millions of customer homes. Further, customer premises 202 may include additional devices, such as switches, gateways, routers, customer premise equipment, etc., that aid in routing data.

Figure 3:
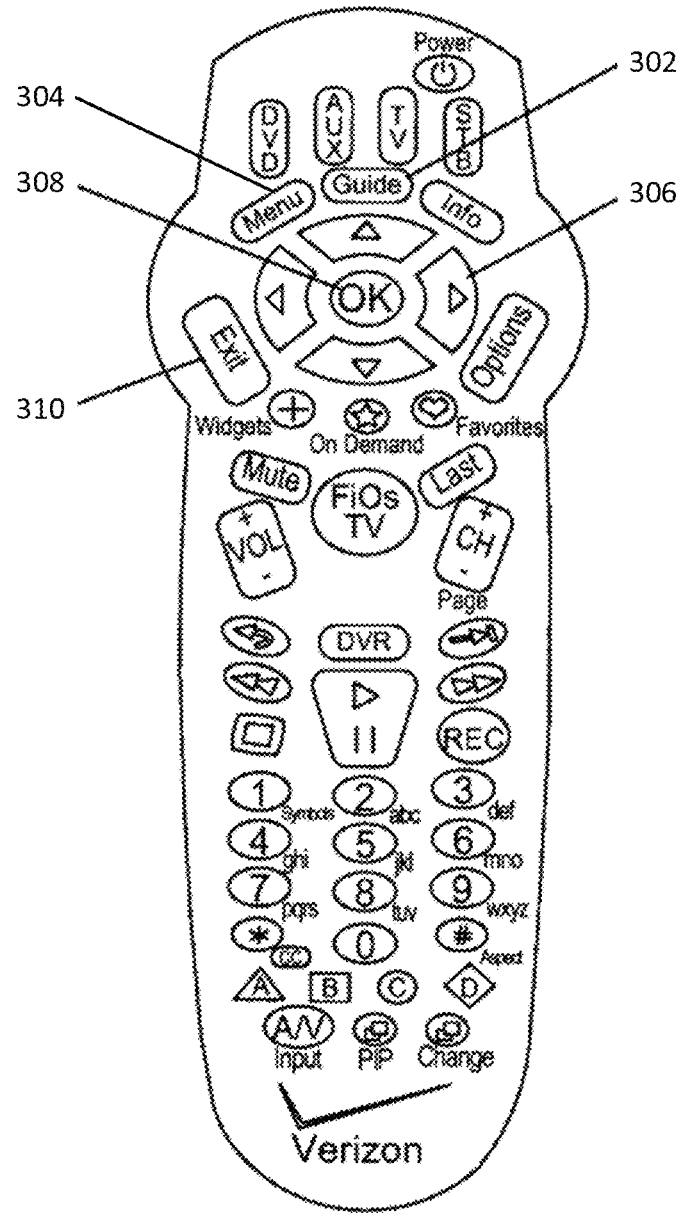
FIG. 3 is an exemplary diagram of the remote control of FIG. 2.

FIG. 3 is an exemplary diagram of remote control 232. As shown, remote control 232 may include a number of buttons that may cause a remote device, such as video client 226, to perform certain functions. Remote control 232 includes a guide button 302, a menu button 304, navigation buttons 306 (e.g., four buttons including arrows), a selection button ("OK") 308, and an exit button 310. In the embodiment of FIG. 3, guide button 302 may cause video client 226 to issue a command to receive and/or display (e.g., on display 104) a calendar of current and upcoming programs; menu button 304 may cause video client 226 to issue a command display (e.g., on display 104) a menu of functions currently available to the user; navigation buttons 306 may cause video client 226 to issue commands allowing the user to navigate, for example, on-screen guides or menus (e.g., by highlighting graphical widgets on display 104); selection button may cause video client 226 to issue a command associated, for example, with a selected or highlighted graphical widget on display 104; and exit button 310 may cause video client 226 to exit from the guide or menu displayed on display 104.

Figure 4:
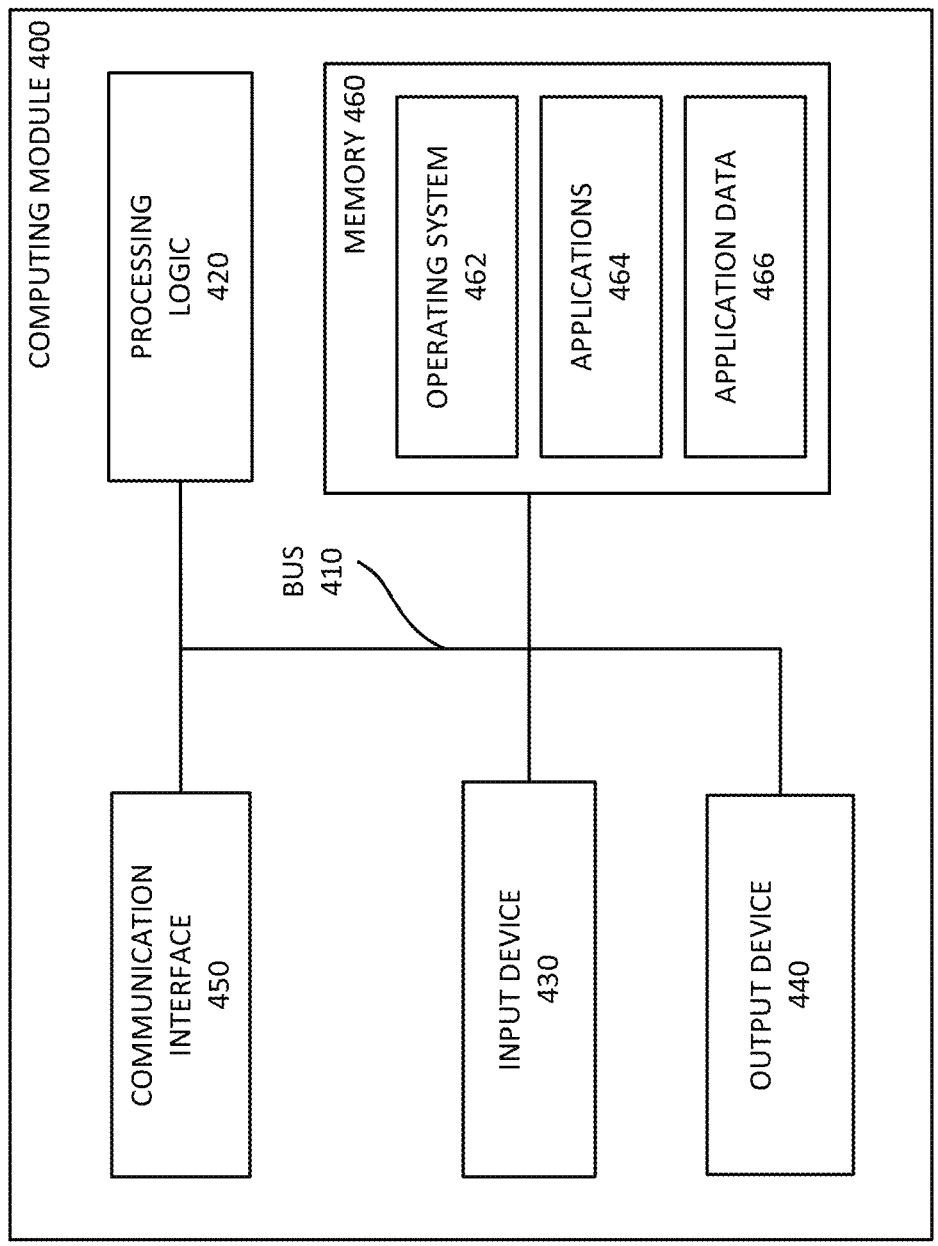
FIG. 4 is a block diagram of exemplary components of a computing module of the devices in FIG. 2.

FIG. 4 is a block diagram of exemplary components of a computing module 400. Devices in customer premises 202 (e.g., devices 220-230) may each include one or more computing modules 400. Regional/national content server 206, on-demand server 208, ad server 210, and interactive content server 212 may also include one or more computing modules 400 (e.g., a rack of computing modules 400). Computing module 400 may include a bus 410, processing logic 420, an input device 430, an output device 440, a communication interface 450, and a memory 460. Computing module 400 may include other components (not shown) that aid in receiving, transmitting, and/or processing data. Moreover, other configurations of components in computing module 400 are possible.

Bus 410 may include a path that permits communication among the components of computing module 400. Processing logic 420 may include any type of processor or microprocessor (or families of processors or microprocessors) that interprets and executes instructions. In other embodiments, processing logic 420 may include an application-specific integrated circuit (ASIC), a field-programmable gate array (FPGA), or the like. 100351 Input device 430 may allow a user to input information into computing module 400. Input device 430 may include a keyboard, a mouse, a pen, a microphone, a remote control (e.g., remote control 232), a touch-screen display, etc. Some devices, such servers 206-212 may be managed remotely and may not include input device 430. In other words, some devices may be "headless" and may not include a keyboard, for example.

Output device 440 may output information to the user. Output device 440 may include a display, a printer, a speaker, etc. Display 104 and computer 228 may, for example, each include a liquid-crystal display (LCD) for outputting information to the user. ONT 206, router 208, and STB 212, for example, may include light-emitting diode (LED) indicators or may not include output device 440. Headless devices, such as servers 206-212 may be managed remotely and may not include output device 440.

Input device 430 and output device 440 may allow the user to activate and interact with a particular service or application, such as an interactive application in video client 226. Input device 430 and output device 440 may allow the user to receive and view a menu of options and select from the menu options. The menu may allow the user to select various functions or services associated with applications executed by client computing module 400.

Communication interface 450 may include a transceiver that enables client computing module 400 to communicate with other devices and/or systems. Communication interface 450 may include a transmitter that may convert baseband signals to radio frequency (RF) signals and/or a receiver that may convert RF signals to baseband signals. Communication interface 450 may be coupled to an antenna for transmission and reception of the RF signals. Communications interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface for communicating with Bluetooth devices, a near-field communication (NFC) interface, etc. Communications interface 350 may also receive, transmit and/or process digital or analog audio inputs/outputs and/or digital or analog video inputs/outputs.

In the case of video client 226, communication interface 450 may include an interface to receive multimedia content in a format defined by the EBIF standard. In one embodiment, video client 226 may also include an interface to receive data over a packet switched network, such as the Internet. In other words, in one embodiment, video client 226 may communicate with router 224 using IP.

Memory 460 may store, among other things, information, instructions (e.g. applications and operating systems), and application data. Memory 460 may include a random access memory (RAM) or another type of dynamic storage device that may store information and instructions; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions.

Memory 460 may include an operating system (OS) 462, one or more applications 464, and application data 466. OS 462 may include software instructions for managing hardware and software resources of computing module 400. For example, OS 462 may include Linux, Windows, OS X, an embedded operating system, etc. Applications 364 may provide network services or user applications, depending on the device in which the particular computing module 400 is found. Likewise, application data 466 may depend on the applications running in memory 460, which may depend on the device in which the particular computing module 400 is found.

Computing module 400 may perform the operations described herein. Computing module 400 may perform these operations in response to processing logic 420 executing software instructions contained in a computer-readable medium, such as memory 460. A computer-readable medium may be defined as a physical or logical memory device. The software instructions may be read into memory 460 from another computer-readable medium or from another device via communication interface 450. The software instructions contained in memory 460 may cause processing logic 420 to perform processes that are described herein.

FIG. 5A is a block diagram of exemplary components of memory 460 found in video client 226. In this embodiment, applications 464 may include an ETV user agent 502, an ETV application 503, a virtual machine (VM) 504, and an extension application 506; application data 466 may include EBIF table(s) 552 and extension application table(s) 554.

ETV user agent 502 may include a software component that is capable of receiving, decoding, presenting, and processing ETV application 503 including, for example, EBIF bytecodes and tables. User agent 502 may be described as implementing a "virtual machine" or an "engine." User agent 502, in conjunction with video client 226 and remote control 232, for example, may allow a user to navigate and interact with the multimedia content presented by the ETV application. User agent 502 may decode EBIF resources, present graphical widgets, and execute actions to present a multimedia page to an end-user. EBIF tables 552 may include action tables, widget tables, generic data tables, metadata tables, EBIF resource locator tables, etc.

Virtual machine 504 may include a software implementation of a machine that may receive and execute or interpret an extension application. The application executed by virtual machine 504 may be described as an "extension application" in that it may extend the functionality of the ETV application being executed by user agent 502. The application executed by virtual machine 504 may also be described as a "script." The application/script may be a written in Lua, JavaScript, or EBIF, for example. Lua is a scripting language with extensible semantics. JavaScript is also a scripting language, which may be used to enable access to objects within other applications. In one embodiment, video client 226 may receive an extension application 506 (e.g., a Lua application or a JavaScript application) and virtual machine 504 may interpret (e.g., execute) extension application 506. Extension application 506 may use extension table(s) 554 that may define actions and store application data.

Figure 5B:
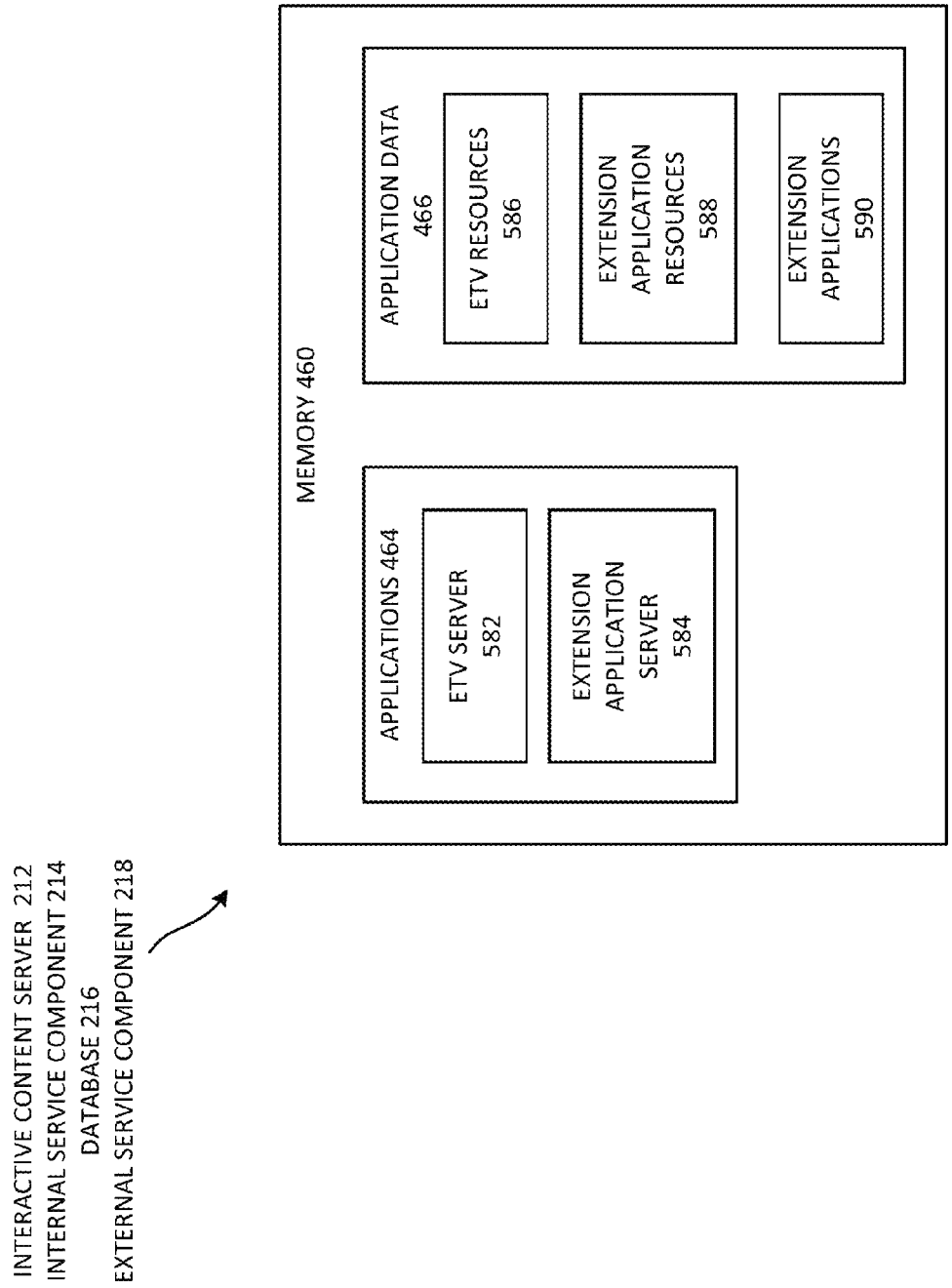
FIG. 5B is a block diagram of exemplary components of the memory found in the interactive content server, the internal service component, the database component, and/or the external service component of FIG. 2.

FIG. 5B is a block diagram of exemplary components of memory 460 found in interactive content server 212, internal service component 214, database 216, and/or external service component. In this case, applications 464 may include an ETV server 582 and an extension application server 584. Application data 466 may include ETV resources 586 (e.g., EBIF tables, bytecodes, and/or ETV applications), extension applications resources 588 (e.g., extension application tables), and extension applications 590.

ETV server 582 may determine which ETV resources and/or applications (e.g., from ETV resources 586) to interleave in MPEG streams for transporting ETV applications to video client 226 and user agent 502. Extension application server may determine which extension applications (e.g., from extension applications 590) and extension application resources (e.g., from extension application resources 588) to sent to video client 226 and user agent 502. Extension resources and extension applications may be identified by a universal resource indicator (URI) or a universal unique identifier (UUID).

FIGS. 5C through 5F are diagrams of exemplary tables 592-598 for extension operation codes, operands, and/or parameters. Information indicative of tables 592-598 may be stored in any device in environment 200, such as video client 226, interactive content server 212, internal service component 214, and/or external service component 214.

FIG. 5C is a diagram of an exemplary extension code table 592. Extension code table 592 specifies exemplary extension operation codes for indicating an extension for an ETV resource. For example, as shown in FIG. 5C, a hexadecimal operation code of 0x13 may indicate that an extension application should be launched by the receiving ETV user agent. An operation code of 0x15 may indicate that ETV resources (e.g., an EBIF table(s)) should be updated, by the receiving ETV user agent, through a second data path. An operation code of 0x12 may indicate that an event should be posted, for later execution, in a queue of the receiving ETV user agent. An operation code of 0x11 may indicate that metrics collected by the ETV application should be stored.

Figure 5D:
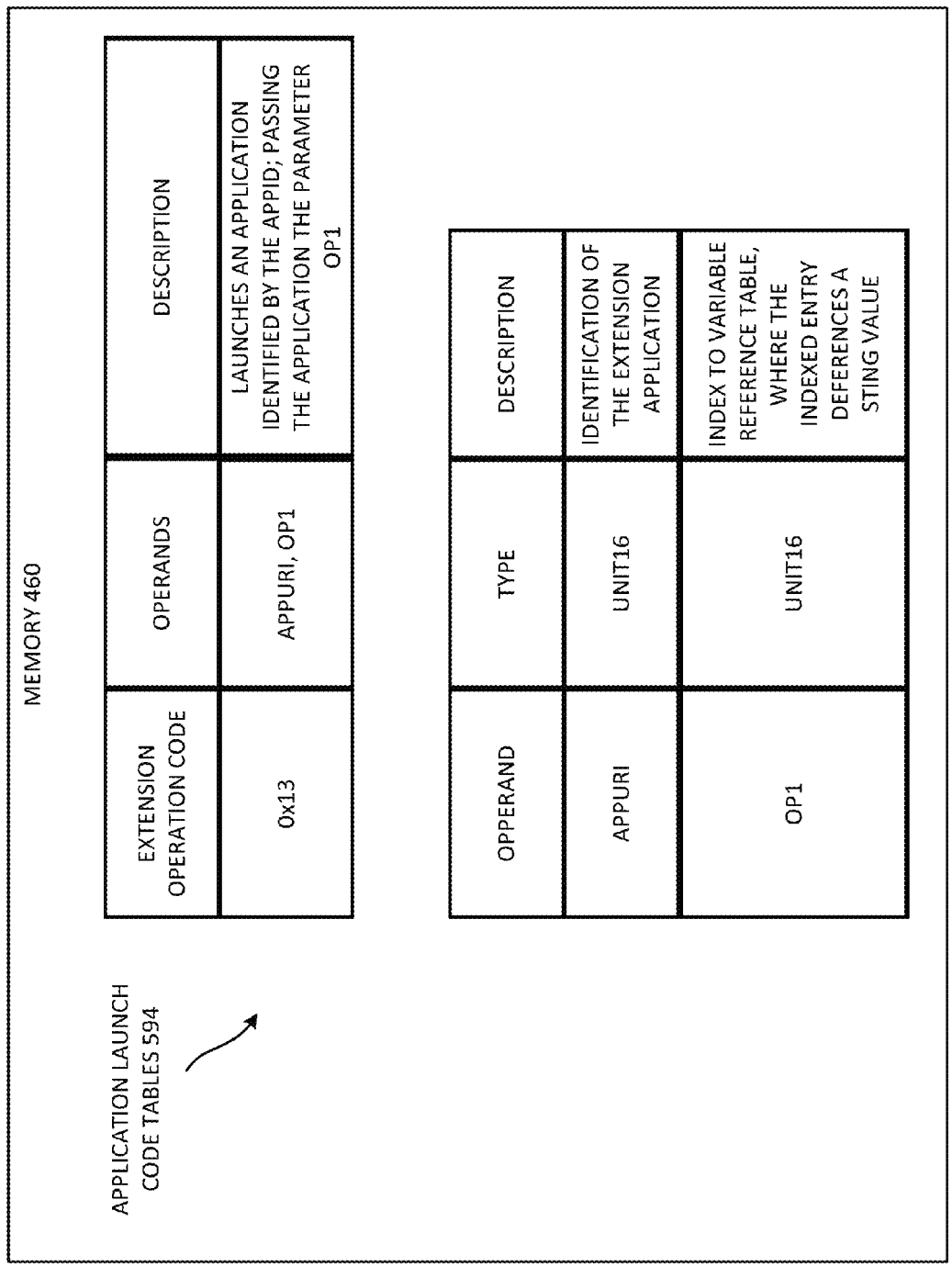

FIG. 5D is a diagram of exemplary application launch code tables 594. Application launch code tables 594 may specify the operands of the extension code for launching an extension application. As shown in FIG. 5D, the operands may include an extension application universal resource identifier (URI) and a second operand. The URI may be a unique identifier of the extension application, such as a universal resource locator (URL) or a universal unique identifier (UUID).

FIG. 5E is a diagram of exemplary update tables 596. Update tables 596 may specify the two operands of the operation code for updating parent application resources (e.g., EBIF tables) using second data path 254. As shown in FIG. 5E, one operand may include a universal resource identifier (URI). The URI may be a unique identifier of the extension application, such as a universal resource locator (URL). The second operand may include private information, such as information specific to the user of video client 226 (e.g., a user name) or specific to video client 226 itself (e.g., a hardware address).

FIG. 5F is a diagram of exemplary post event tables 598. Post event tables 598 may specify the operands of the extension code for posting an event to a parent application user agent. As shown in FIG. 5F, the first operand may specify the event to be posted to the ETV user agent. The second operand may include private information, such as information specific to the user of video client 226 (e.g., a user name) or specific to video client 226 itself (e.g., a hardware address).

Figure 6A:
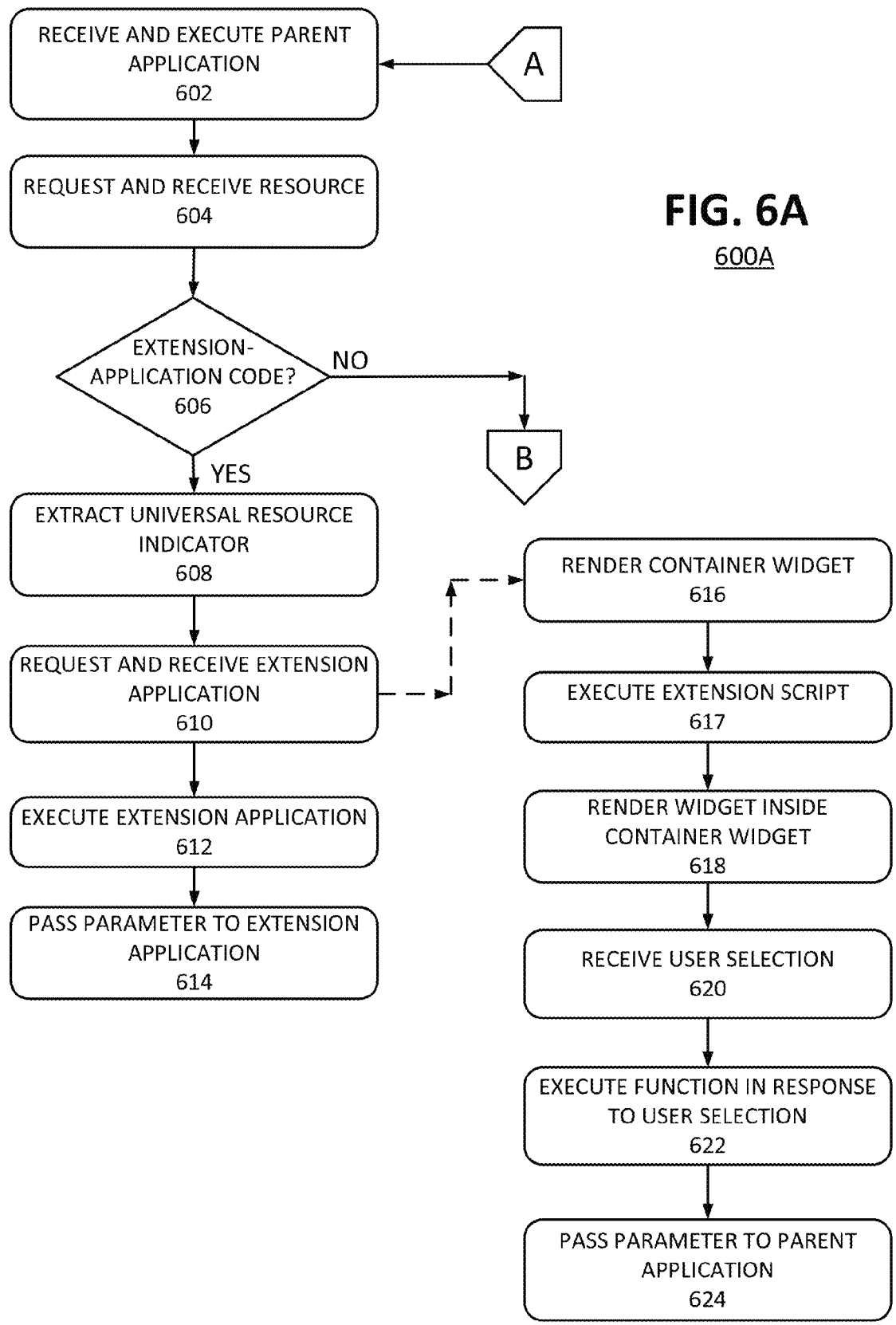
FIGS. 6A, 6B, and 6C are flowcharts of an exemplary process 600 for enhancing an ETV application.

As discussed above, embodiments disclosed herein allow for extending the Enhanced Television (ETV) experience for a user. FIG. 6A is a flowchart of an exemplary process 600A for extending an ETV application by, for example, launching an application. User agent 502 may receive and execute a parent application (block 602). In one embodiment, a "parent application" may include an ETV application. For example, a video program being viewed by a user may include interactive features that are included in EBIF resources (e.g., tables and bytecodes) that are executed by an ETV user agent.

Returning to FIG. 1 as an example, video program 106 may include an ETV application (e.g., a "parent application") allowing a user to rate video program 106 or send a link to video program 106 to a friend. Video client 226 may download this ETV application from interactive content server 212, for example, through content delivery server 204. User agent 502 may execute the ETV application that, in this example, renders widget 108 superimposed on video program 106 on display 104. Ranking widget 110 and send-show widget 112, which may also be rendered by the ETV application, are within widget 108. The user may use remote control 232 (e.g., buttons 306 and 308) to select one of the five stars to rate video program 106. After selecting one of the five stars, the ETV application may send the ranking information (e.g., 1-5) back to interactive content server 212 so that interactive content server 212 may, for example, tally results from many voting users.

A resource identified in the parent application may be requested and received (block 604). In one embodiment, the resource identified by the parent application includes an ETV or EBIF resource. For example, using remote control 232, the user may select send-show widget 112. In response to the selection by the user, the ETV application may request an EBIF resource from interactive content server 212. Interactive content server 212 may respond to the request with the requested EBIF resource.

The requested EBIF resource may include an action code with an extension operation code. For example, as specified in extension code table 592, an extension code of 0x13 indicates that the ETV application may launch an extended interactive application. If the received resource indicates an extension-application code (block 606: YES), a universal resource indicator (URI) may be extracted from the received resource (block 608). As shown in application launch code tables 594, the URI may be indicated by the operand APPURI of the extension operation code. The URI may identify the extended application.

The extension application may be requested and received (block 610). For example, user agent 502 may request extension application 506 using the URI extracted in block 608. In one embodiment, extension application 506 may be requested and received from a data path other than the data path carrying the resource requested and received in block 604. In this example, the request for the extension application may traverse an IP path (e.g., second data path 254) from video client 226 to, for example, interactive content server 212 or internal service component 214. In this case, the request may traverse second data path 254 from video client 226 through router 224 to ONT 220. In another embodiment, an IP path may exist between video client 226 and ONT 220 without having to pass through router 224. Second data path 254 (e.g., the IP path) may include a larger bandwidth and/or lower latency than first data path 252 (e.g., the data path carrying the ETV application and ETV/EBIF resources). Therefore, downloading the extended application over second data path 254 may allow for larger interactive applications delivered to video client 226 in less time with less delay than with first data path 252.

Figure 7A:
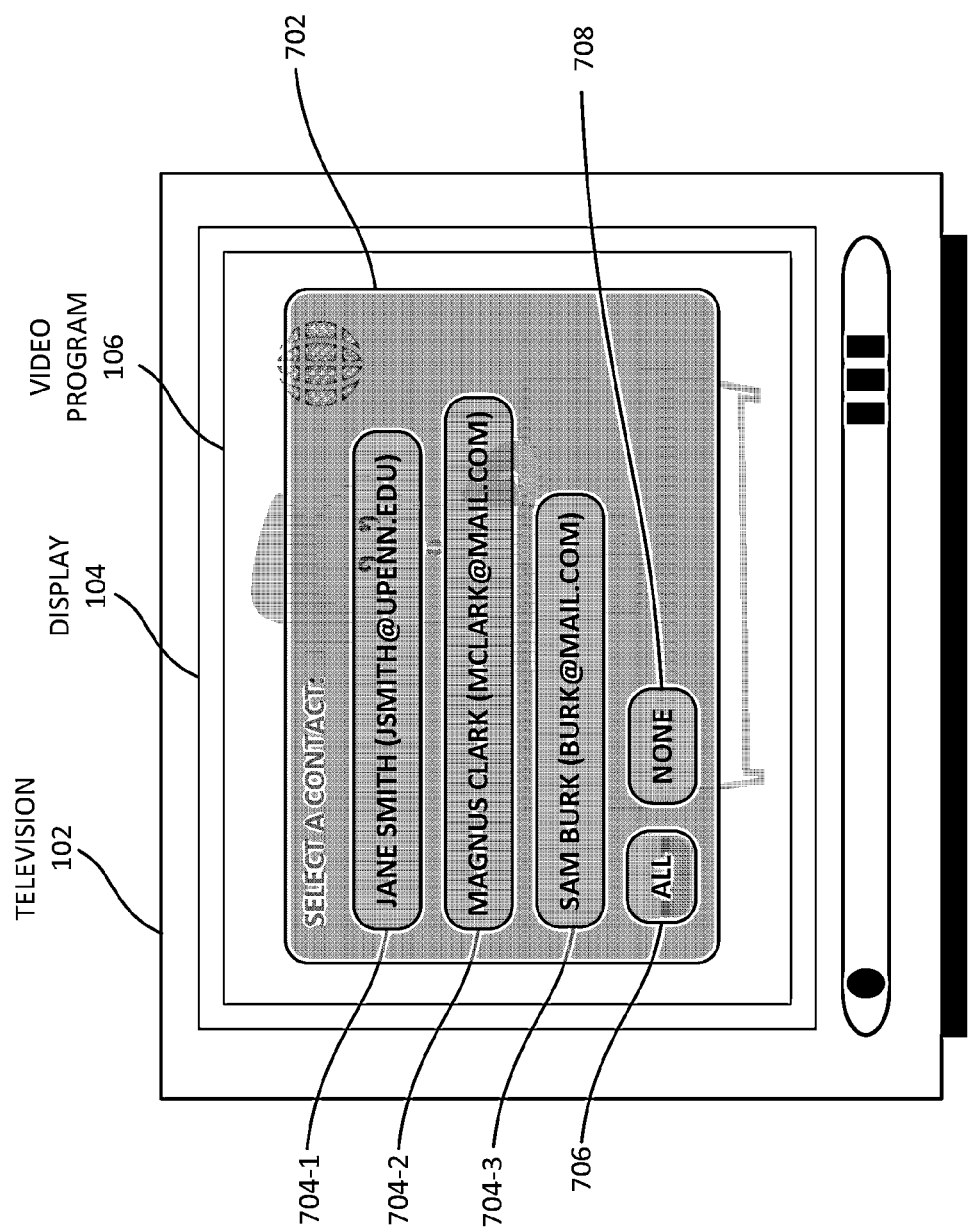
FIGS. 7A and 7B are block diagrams of a television, display, and a video program according to embodiments described herein.

The extension application may be executed (block 612). The extension application, in one embodiment, may be expressed in a language other than the language of the parent application. For example, if the parent application is an ETV application including EBIF, then the extension application may be expressed in Lua, JavaScript, or EBIF. FIG. 7A shows an exemplary extension application being executed in television 102 on display 104 and superimposed on video program 106. The example in FIG. 7A is a continuation of the example above, where the user selects send-show widget 112 (e.g., using remote control 232). In response to the selection by the user, the ETV application (e.g., ETV user agent 502) requests an EBIF resource that includes an extension application code (block 606: YES) and a URI identifying the extension application, which is requested and received in block 610 described above. In this example, the extension application (executing in virtual machine 504) may render widget 702 superimposed on video program 106 on display 104.

A parameter may be passed to the extension application (block 614). For example, the downloaded EBIF resource (e.g., from block 604) may include an operand that points to a memory location in video client 226. The operand may be extracted from the received EBIF resource and passed to the extension application. In another embodiment, the data at the memory location pointed to by the operand may be passed to the extension application. In the example of FIGS. 7A, the parameter passed to the extension application may include private information, such as a unique identifier of the user (e.g., a user name) or video client 226 (e.g., the hardware address of the set-top box). In this example, the extension application may request resources that are specific to the user name of the user of video client 226.

Returning to the example of FIG. 7A, the extension application requests and receives a list of contacts associated with the user of video client 226 and renders contact-name widgets 701-1 through 701-3 inside widget 702. The extension application may request resources of a data path (e.g., second data path 254) other than the EBIF data path (e.g., first data path 252). In this example, the extension application may request the contact information of the user of video client 226, the identity of whom the extension application received as a parameter, over second data path 254 (e.g., the IP data path). As discussed above, widget 702 may include a number of contact-name widgets 701-1 through 701-3 (collectively contact-name widgets 701), an ALL widget 706, and a NONE widget 708.

In this embodiment, second data path 254 (e.g., the IP path) may include a larger bandwidth and/or lower latency than first data path 252 (e.g., the path providing EBIF data). In addition, the data requested (e.g., the contact information) may be very extensive. Therefore, downloading the extension application over the second data path 254 may allow for larger interactive applications delivered to video client 226 in a shorter amount of time.

In one embodiment, the ETV application terminates upon execution of the extension application. In this embodiment, an ETV application may restart upon the completion of the extension application. In an alternative embodiment, the ETV application does not terminate upon execution of the extension application.

Figure 7B:
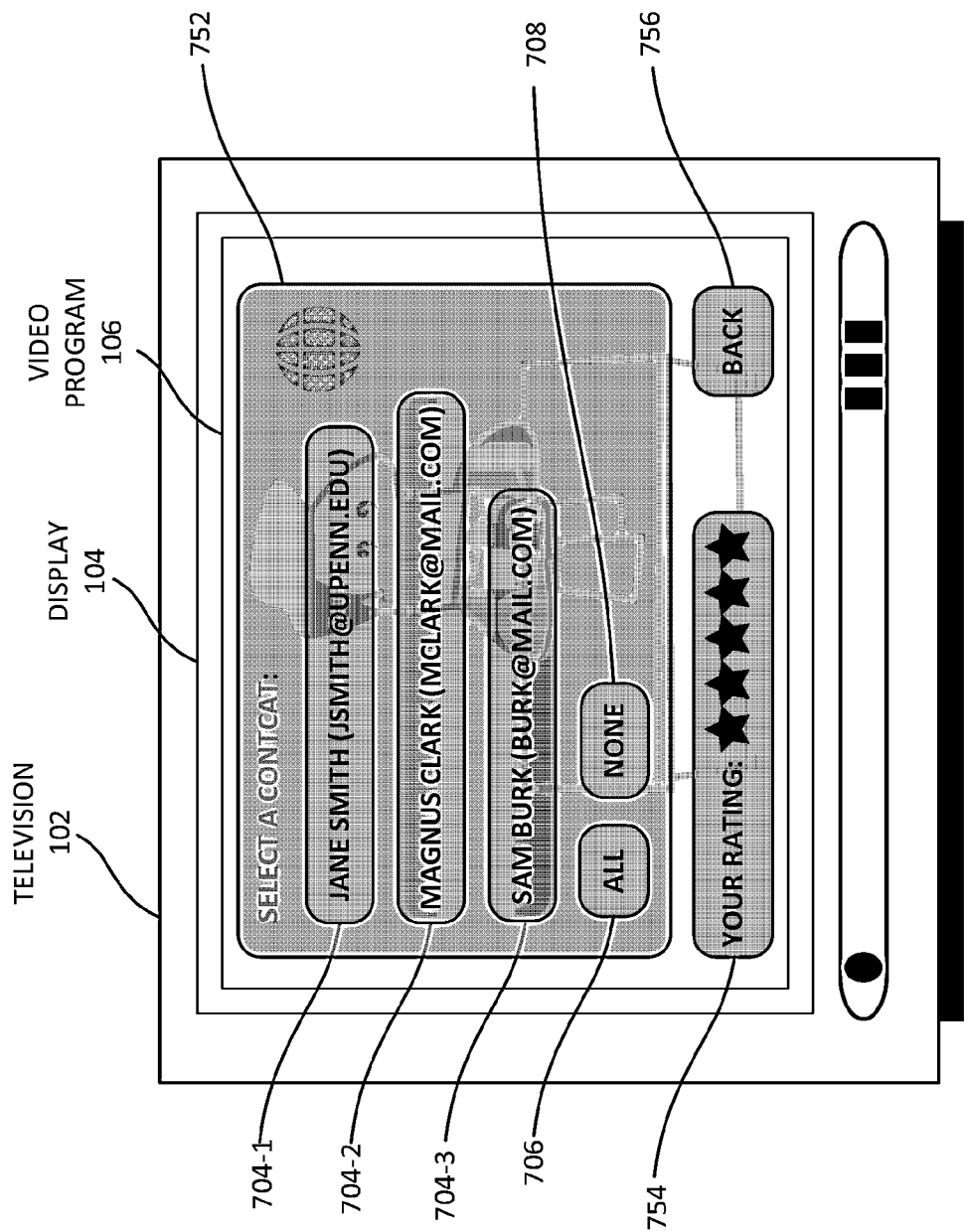

The embodiment in which the ETV application does not terminate is described in more detail with respect to blocks 616-624 in FIG. 6A and FIG. 7B. FIG. 7B shows an exemplary extension application being executed in television 102 on display 104 and superimposed on video program 106. Like FIG. 7A, FIG. 7B is a continuation of the example above, where the user selected send-show widget 112 leading to an extension application being requested and downloaded in block 610. In this example, the ETV application and the extended application may execute in parallel.

A container widget 752 may be rendered (block 616). Container widget 752 of FIG. 7B appears similar to widget 702 of FIG. 7A, the difference being the application that rendered widget 752. In the embodiment of FIG. 7B, the ETV application rendered widget 752 rather than the extended application (that rendered widget 702). In this embodiment, the ETV application may pass the size and location of container widget 752 to the extension application, which may also be executing in parallel (block 617). Because the ETV application is still running, it may render other widgets in addition to container widget 752. For example, as shown in FIG. 7B, the ETV application may render a rating widget 754 and a BACK widget 756 on display 104 simultaneously with container widget 752.

A graphical widget may be rendered by the extension application inside the container widget (block 618). For example, the extension application may render contact widgets 701, ALL widget 706, and NONE widget 708.

An indication that a user selected a widget in the container widget may be received (block 620). In the example of FIG. 7B, a user may select a widget (e.g., NONE widget 708) inside container widget 752. The ETV application may receive the indication and pass the indication to the extended application associated with container widget 752. A function may be executed in response to the indication that the user clicked on the widget (block 622). The function may be a graphical function. Alternatively, the function may be a non-graphical function.

A parameter may be passed from the extension application to the parent application (block 624). During execution of the extension application, or at termination of the execution of the extension application, a parameter may be passed from the extension application to the ETV application. For example, should a user select the NONE widget 708, the extended application may terminate and pass a parameter to the ETV application that container widget 752 may be removed from display 104. In one embodiment, the parameter passed back to the ETV application may include the result of the non-graphical function.

In one embodiment, the ETV application does not render any other widgets onto the video screen other than the container widget. In this embodiment, container widget 752 may occupy the entire display 104. In an alternative embodiment, the ETV application may render many container widgets 752 and an extension application (potentially different extension applications) may be associated with each container widget 752.

Figure 6B:
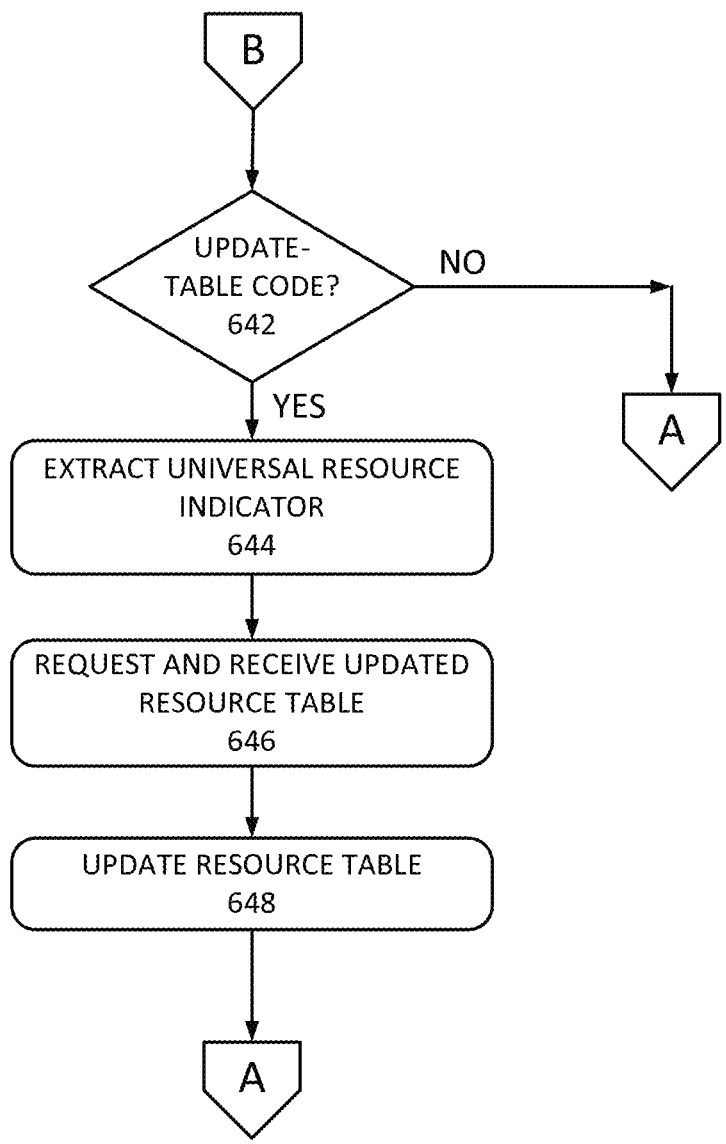

FIG. 6B is a flowchart of an exemplary process 600B for updating a resource table. As discussed above with respect to process 600A, the resource identified in the parent application may be requested and received (block 604). If the received parent resource indicates an update-table code (FIG. 6B; block 642: YES), a universal resource indicator (URI) may be extracted from the parent resource (block 644). As shown in update tables 596, the URI may be indicated by the operand OP1 of the update-table code. The URI may identify the location of the updated table information. For example, the URI may indicate tables stored in internal service component 214. As also shown in update tables 596, private information may be indicated in the operand OP2 of the update-table code. The private information may include, for example, the user name of the user of video client 226 or the hardware address of video client 226.

The resource table may be requested and received (block 646). In one embodiment, the request may be made by user agent 502 over second data path 254. The request for the resource table may include the private information. As such, the request may be specific to the user name or the video client 226, for example. In one embodiment, the resource table may be received over second data path 254 as well. The resource table sent to and received by video client 226 may be specific to the private data, e.g., specific to the user name or video client 226. In this embodiment, first data path 254 may not be sufficient to provide resource tables specific to video client 226 and/or a user name. Rather, in this embodiment, second data path 254 may allow for the bandwidth to provide for resource tables specific to video client 226 and/or a user name.

If the received resource (block 604) does not indicate an extended-application code (block 606: NO) and does not indicate an update-table code (block 642: NO) then ETV user agent 502 may continue running the ETV application (block 602) by receiving and executing the parent application.

In the embodiments and examples above, the action code (e.g., the extension-application code 0x13 or update-table code 0x12) may be in the additional; resource identified in the parent application and requested/received in block 604. In other embodiments, the action code may be included in the parent application itself without requesting or receiving an additional resource. Thus, in this embodiment, block 604 may be omitted. For example, block 604 may be omitted in the exemplary process of FIG. 6C, discussed below.

In one embodiment, the parent application (e.g., an EBIF application/resource) may be received (block 602) over second data path 254 (e.g., over an IP path and/or IP over Ethernet). In this embodiment and the embodiments discussed above, the parent application (e.g., EBIF application/resource) may be identified by a URI associated with a channel in a program guide received by user agent 502. In this embodiment, the URI may address an IP multicast interactive application. In another embodiment, the requested and received resource (block 604) may include an EBIF resource received over second data path 254 (e.g., over an IP path and/or IP over Ethernet).

Figure 6C:
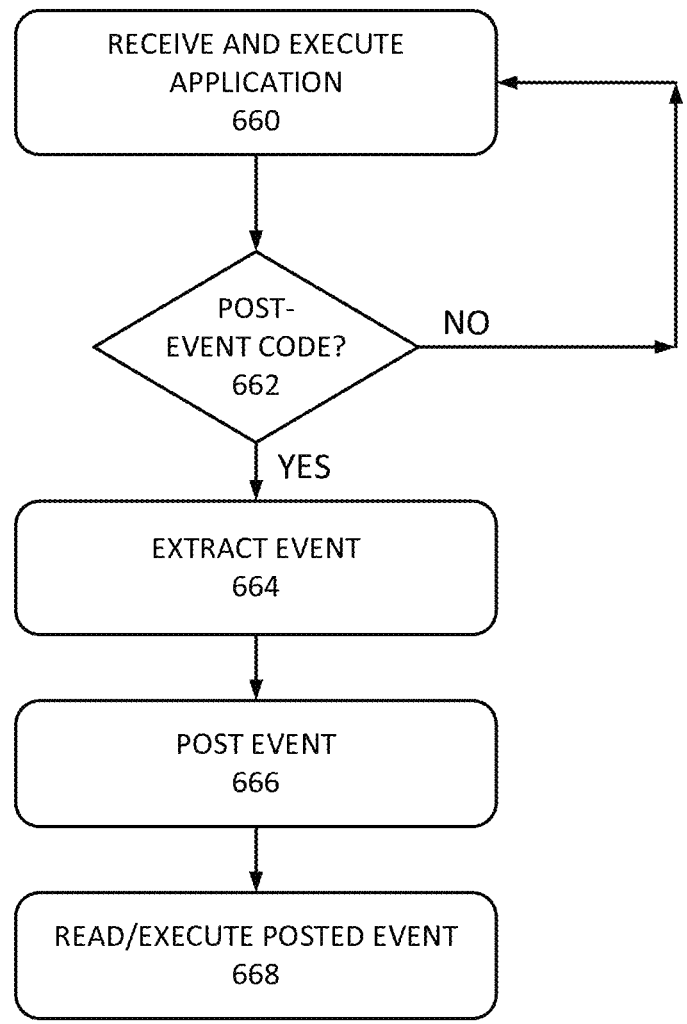

FIG. 6C is a flowchart of an exemplary process 600C for posting an event for an ETV user agent. An event may be posted, for example, to receive permission from the user to enter an interactive mode (e.g., to continue executing the parent application). Process 600C may begin with user agent 502 receiving and executing an application (block 662). In one embodiment, the application may include an ETV application. For example, a video program being viewed by a user may include interactive features that are included in EBIF resources (e.g., tables and bytecodes) that are executed by an ETV user agent. Video client 226 may download this ETV application from interactive content server 212, for example, through content delivery server 204. If the application (e.g., a script) indicates a post-event code (FIG. 6C; block 662: YES), an event may be extracted from the application (block 664). As shown in post-event tables 598, the event may be indicated by the operand EVENT of the post-event code. The identified event may include an operand itself that may also be extracted. Examples of events include NOT_LOADED, BUG_STATE, FULL_STATE, and SUSPEND. Each of these events may be identified by an integer, such as 0, 1, 2, or 3, respectively.

A BUG_STATE event code may specify a display of a GUI dialog box requesting that the user allow an interactive mode to begin (e.g., to allow the application to continue running). Parameters (e.g., the time the event should expire, the location of the dialog box, etc.) may be specified in the additional operands of the action code and/or in extension application tables 554. In this state, for example, remote control 232 may be used for responding to the dialog box (e.g., YES or NO).

A FULL_STATE event may indicate or allow the application to continue into full ITV mode. In a full state, for example, remote control 232 may be used for the interactive application. A FULL_STATE event may be posted, for example, after or when the user responds to a dialog box indicating a desire to enter an interactive mode. A SUSPEND event code may indicate or allow the suspension of the application, e.g., until a FULL_STATE code is received and posted. In a suspended state, for example, remote control 232 may be used to resume execution of the application (e.g., select a FULL_STATE event code). A NOT_LOADED event may indicate or allow the termination of the application, e.g., preventing the interactive mode from continuing.

The event may be posted (block 666) in, for example, a queue for user agent 502 to act upon. In one embodiment, additional events may be extracted (block 664) and posted (block 666) from the same post-event code. At the appropriate time, the posted event may be read and/or executed (block 668). For example, a dialog box may be displayed (e.g., a BUG_STATE event), the application may be executing (e.g., FULL_STATE event), the application may be suspended (e.g., SUSPEND_STATE event posted), or the application may be terminated (e.g., NOT_LOADED event).

If the application does not indicate a post-event code (block 662: NO), then ETV user agent 502 may continue running the ETV application (block 660) by receiving and executing the parent application.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

For example, in an alternative embodiment, rather than the received EBIF resource including a URI identifying the extension application, the extension application may be included in the EBIF resource itself.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A method comprising:
   receiving an enhanced television (ETV) application in a video client over a first data path;
   executing the ETV application in the video client, wherein the ETV application includes an enhanced television binary interchange format (EBIF) resource;
   extracting, from the EBIF resource, an identifier of an extension application;
   transmitting a request for the identified extension application;
   receiving the extension application in the video client, over a second data path different than the first data path, wherein the extension application received in the video client includes an application in a language and format other than EBIF; and
   executing, in the video client in the language and format other than EBIF, the extension application including the application in the language and format other than EBIF.

2. The method of claim 1, wherein the first data path includes a first bandwidth and the second data path includes a second bandwidth, and wherein the second bandwidth is larger than the first bandwidth.

3. The method of claim 2, wherein the ETV application includes a program guide and wherein the video client employs Internet Protocol over Ethernet at the video client to receive the extension application in the language and format other than EBIF in the video client.

4. The method of claim 3, wherein requesting the identified extension application includes requesting the extension application over the second data path, and wherein the video client employs a protocol other than Internet Protocol over Ethernet at the video client to receive the ETV application.

5. The method of claim 1, further comprising:
   passing a parameter from the ETV application to the extension application, wherein the parameter identifies a user of the ETV application or wherein the parameter is unique to the video client.

6. The method of claim 5, further comprising:
   passing a parameter from the extension application to the ETV application.

7. The method of claim 1, further comprising:
   extracting, from the EBIF resource, an identifier of an EBIF table;
   requesting the EBIF table;
   receiving, at the video client, the EBIF table over the second data path; and
   updating the ETV application based on the received EBIF table.

8. The method of claim 7,
   wherein requesting the EBIF table includes providing a unique identification of a user of the ETV application or a unique identification of the video client.

9. The method of claim 1, further comprising:
   rendering, by the ETV application, a container widget; and
   rendering, by the extension application, a widget within the container widget.

10. A device comprising:
    a receiver to receive an enhanced television (ETV) application over a first data path;
    a processor to execute the ETV application, wherein the ETV application includes an enhanced television binary interchange format (EBIF) resource, wherein the processor is configured to extract, from the EBIF resource, an identifier of an extension application;
    a transmitter to send a request for the extension application based on the extracted identifier of the extension application,
       wherein the receiver receives, over a second data path different than the first data path, the extension application in a language and format other than EBIF, and
       wherein the processor executes, in the language and format other than EBIF, the extension application.

11. The device of claim 10,
wherein the first data path includes a first bandwidth and the second data path includes a second bandwidth, and wherein the second bandwidth is larger than the first bandwidth;
wherein the receiver includes an Ethernet port or a WiFi receiver and wherein the receiver receives the extension application over the second data path employing Internet Protocol through the Ethernet port or the WiFi receiver.

12. The device of claim 10, wherein the processor is configured to extract, from the EBIF resource, an indication of whether the ETV application or the extension application is in an interactive mode, is waiting is for an input from a user before entering an interactive mode, or has suspended an interactive mode.

13. The device of claim 10,
wherein the processor is configured to pass a parameter from the ETV application to the extension application, wherein the parameter uniquely identifies a user of the ETV application or uniquely identifies the device.

14. The device of claim 13,
wherein the processor is configured to pass a parameter from the extension application to the ETV application, wherein the parameter indicates that a container widget used by the extension application is no longer needed.

15. The device of claim 10,
wherein the processor is configured to extract, from the EBIF resource, a universal resource indicator (URI) identifying an EBIF table;
wherein the transmitter sends a request for the EBIF table;
wherein the receiver receives the EBIF table over the second data path; and
wherein the processor is configured to update the ETV application based on the received EBIF table.

16. The device of claim 15,
wherein requesting the EBIF table includes providing a unique identification of a user of the ETV application or a unique identification of the device.

17. The device of claim 10, further comprising:
a display,
wherein the device is a set-top box including the processor, the transmitter, and the receiver, and wherein the set-top box is located in a same premises as the display;
wherein the processor, instructed by the executing ETV application, renders a container widget on the display; and
wherein the processor, instructed by the executing extension application, renders a widget on the display within the container widget.

18. The device of claim 10, wherein the transmitter sends the request for the extension application over the second data path.

19. A method comprising:
sending, over a first data path, an enhanced television binary interchange format (EBIF) resource to a video client executing an enhanced television (ETV) application, wherein the EBIF resource includes an identifier of an extension application;
receiving, from the video client, a request for the identified extension application based on the identifier, wherein the extension application is in a language and format other than EBIF;
sending, over a second data path different than the first data path, the extension application to the video client, wherein the video client is configured to execute the extension application in the language and format other than EBIF,
wherein the second data path has a second bandwidth larger than the first data path, and wherein the second data path employs an Internet Protocol (IP).

20. The method of claim 19, further comprising:
receiving a parameter from the ETV application, wherein the parameter identifies a user of the ETV application or wherein the parameter is unique to the video client,
wherein sending the extension application sent to the client depends on the parameter identifying the user or the parameter unique to the video client.

21. The method of claim 20, wherein the EBIF resource includes, a universal resource indicator (URI) identifying an EBIF table, the method further comprising:
receiving a request for the EBIF table; and
sending, to the video client, the EBIF table over the second data path, wherein the second data path employs an Internet Protocol over Ethernet at the video client.

22. The method of claim 21,
wherein the request for the EBIF table includes a unique identification of a user of the ETV application or a unique identification of the video client;
wherein sending the EBIF table includes sending an EBIF table specific to the unique identification of the user or specific to the unique identification of the video client.

23. The method of claim 19, wherein receiving the request for the requesting the identified extension application includes receiving the identified extension application over the second data path.

24. A system comprising:
a network device having a transceiver,
wherein the transceiver sends, over a first data path having a first bandwidth, an enhanced television binary interchange format (EBIF) resource to a video client executing an enhanced television (ETV) application, wherein the EBIF resource identifies an extension application, wherein the extension application is in a language and format other than EBIF;
wherein the transceiver receives, from the video client, a request for the identified extension application;
wherein the transceiver sends, over a second data path different than the first data path, the extension application in the language and format other than EBIF to the video client, wherein the second data path has a second bandwidth larger than the first data path, and wherein the video client is configured to execute, in the language and format other than EBIF, the extension application.

25. The system of claim 24, further comprising the video client, wherein the video client comprises:
a processor to execute the ETV application and to execute, in the language and format other than EBIF, the extension application;
a receiver to receive the EBIF resource in the video client over a first data path having a first bandwidth, wherein the processor is configured to extract, from the EBIF resource, an identifier of an extension application; and
a transmitter to send the request for the identified extension application.

* * * * *